United States Patent
Brown

(10) Patent No.: US 8,850,803 B2
(45) Date of Patent: Oct. 7, 2014

(54) AUXILIARY POWER AND EMISSION-CONTROL SYSTEM USING VENTED GASEOUS FUEL RECOVERY AND METHOD

(71) Applicant: Caterpillar Inc., Peoria, IL (US)

(72) Inventor: Cory A. Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 13/709,460

(22) Filed: Dec. 10, 2012

(65) Prior Publication Data

US 2014/0157764 A1 Jun. 12, 2014

(51) Int. Cl.
*F01N 3/20* (2006.01)
*F01N 3/00* (2006.01)

(52) U.S. Cl.
CPC .......................................... *F01N 3/00* (2013.01)
USPC ................... 60/303; 60/274; 60/285; 60/295; 60/299; 60/301; 123/179.19; 123/520; 123/527

(58) Field of Classification Search
USPC ................... 60/274, 285, 295, 299, 301, 303; 123/179.19, 518, 519, 520, 527
See application file for complete search history.

(56) References Cited

U.S. PATENT DOCUMENTS

| | | | |
|---|---|---|---|
| 5,964,088 A * | 10/1999 | Kinugasa et al. | 60/286 |
| 6,659,730 B2 | 12/2003 | Gram et al. | |
| 7,047,899 B2 | 5/2006 | Laurilehto et al. | |
| 7,464,550 B2 | 12/2008 | Hoetger et al. | |
| 7,793,502 B2 | 9/2010 | Lee et al. | |
| 2006/0053806 A1 | 3/2006 | Tassel | |
| 2009/0215328 A1 | 8/2009 | Daffey | |
| 2010/0186447 A1 | 7/2010 | Straver | |
| 2011/0185748 A1 | 8/2011 | Fuchs | |

FOREIGN PATENT DOCUMENTS

JP 56-081206 7/1981
WO WO 2012/040835 4/2012

* cited by examiner

*Primary Examiner* — Thomas Denion
*Assistant Examiner* — Jorge Leon, Jr.
(74) *Attorney, Agent, or Firm* — Leydig, Voit & Mayer, Ltd.

(57) ABSTRACT

A system includes a main engine operating on gaseous fuel from a tank. An auxiliary engine operates using gaseous fuel vented from the tank. A first exhaust passage receives a first stream of exhaust gas from the main engine. A second exhaust passage receives exhaust gas from the auxiliary engine, which passes through an ammonia-producing catalyst. A third exhaust passage is fluidly connected to the first and second exhaust passages and routes exhaust gas through a NOx reducing catalyst. The system operates such that a mass flow of ammonia generated by the ammonia-producing catalyst substantially matches a total mass flow of NOx gas in the third exhaust passage that is treated within the ammonia-producing catalyst.

20 Claims, 3 Drawing Sheets

AUXILIARY POWER AND EMISSION-CONTROL SYSTEM USING VENTED GASEOUS FUEL RECOVERY AND METHOD

TECHNICAL FIELD

This patent disclosure relates generally to engine systems and, more particularly, to engine systems using gaseous fuels.

BACKGROUND

Use of liquefied gas as a fuel source for various applications has gained popularity in recent years due to the lower cost and cleaner burning of gaseous fuels such as liquefied petroleum gas (LPG), compressed natural gas (CNG), or liquefied natural gas (LNG), as compared to more traditional fuels such as gasoline or diesel. In practical applications, for example, mining trucks, locomotives, highway trucks and the like, to gain sufficient range between refueling, the gaseous fuel is stored and carried on-board the vehicle in a liquefied, pressurized, cryogenic state. Before the cryogenically stored fuel is to be used by the engine, it is heated to elevate its temperature from about −160 deg. C. to about 90 deg. C. Moreover, the gaseous fuel is pressurized for injection into the intake system or the engine cylinders to provide sufficient power density.

Well insulated pressure tanks are typically used to store and carry cryogenic fuel in a liquid state on board the vehicle. From there, fuel may be drawn in a liquid state, pressurized, and heated before being provided for use by an engine. However, regardless of the degree of insulation provided by the tank, the fuel stored therein is still subject to heating from the environment. For this reason, typical storage tanks include pressure-regulated vents, which can release fuel in a gaseous state from within the tank such that tank pressure can be controlled. In mobile applications, the vented gas may be released for dispersion in the atmosphere, while in stationary applications the vented gas may be disposed through a flame stack.

The amount of gas that may be disposed in this fashion may depend on numerous factors, for example, the filled state of the tank, ambient temperature, insulation quality of the storage tank, and other factors. It would be desirable to reduce the amount of fuel vented from the tank and thus the cost associated with replacing this fuel for use by the engine.

SUMMARY

The disclosure describes, in one aspect, an auxiliary power and emission-control system using gaseous fuel recovery. The system includes a cryogenic gaseous fuel storage tank for containing a gaseous fuel. The tank includes a vent. A main engine operates using the gaseous fuel. A primary gaseous fuel supply system supplies the gaseous fuel from the tank to the main engine. An auxiliary engine operates using the gaseous fuel and provides power to at least one auxiliary component of the system. A secondary gaseous fuel supply system supplies the gaseous fuel from the vent to the auxiliary engine. A first exhaust passage receives a first stream of exhaust gas from the main engine. A second exhaust passage receives a second stream of exhaust gas from the auxiliary engine. An ammonia-producing catalyst is disposed along the second exhaust passage for treating the second stream of exhaust gas from the auxiliary engine. A third exhaust passage is fluidly connected to the first and second exhaust passages. The third exhaust passage routes the first and second exhaust gas streams through at least a NOx reducing catalyst that is disposed along the third exhaust passage for treating the first and second streams of exhaust gas. The auxiliary power and emission-control system is configured to operate such that the second exhaust gas stream generates a mass flow of ammonia that substantially matches a total mass flow of NOx gas in the third exhaust passage that is treated within the ammonia-producing catalyst.

In another aspect, the disclosure describes a gaseous fuel recovery and emission control system. The system includes a cryogenic gaseous fuel storage tank for containing the gaseous fuel. The tank has a vent for regulating a tank pressure by expelling gaseous fuel from the tank. A primary gaseous fuel supply system is adapted for supplying the gaseous fuel from the tank to a first internal combustion engine, and a secondary gaseous fuel supply system is adapted for supplying the gaseous fuel from the vent to a second internal combustion engine. A pump pressurizes the gaseous fuel to an operating pressure. The pump is disposed along the primary gaseous fuel supply system between the tank and the first internal combustion engine. An accumulator collects gaseous fuel at the operating pressure and is disposed along the primary gaseous fuel supply system between the pump and the first internal combustion engine. A secondary gas supply valve selectively fluidly interconnects the accumulator with the secondary gaseous fuel supply system such that gaseous fuel from the accumulator can be supplied to operate the second internal combustion engine in addition to gaseous fuel provided to the second internal combustion engine from the vent.

In yet another aspect, the disclosure describes a method for recovering a gaseous fuel from a tank vent and for controlling emissions in an engine system. The method includes storing a gaseous fuel such as natural gas in a cryogenic state within a tank, drawing from the tank, compressing to an operating pressure, heating to an operating temperature a stream of the gaseous fuel, and collecting the gaseous fuel in an accumulator. Gaseous fuel from the accumulator is provided to operate a main engine of the system. Gaseous fuel vented from the tank and gaseous fuel from the accumulator are provided, as required, to operate an auxiliary engine. A first exhaust gas stream is collected from the main engine. A second exhaust gas stream is collected from the auxiliary engine, and at least a portion of NOx gases included in the second exhaust gas stream from the auxiliary engine is converted into ammonia. The first and second exhaust gas streams are merged in a main exhaust passage and routed through a NOx-reducing catalyst.

DETAILED DESCRIPTION

This disclosure relates to management systems for cryogenically stored gases and, more particularly, to a system for recovering vented gaseous fuel such as the fuel used by internal or external combustion engines. In the illustrated embodiment, certain principles are described in the context of a stationary or mobile application of an engine system that at least partially operates using a gaseous fuel. It should be appreciated, however, that any other type of engine, for example, an external combustion engine, using different gaseous fuel types alone or in combination with non-gaseous fuels may be used. In general, the disclosed systems and method are applicable to any application using a gaseous fuel that is stored in a tank.

Figure 1:
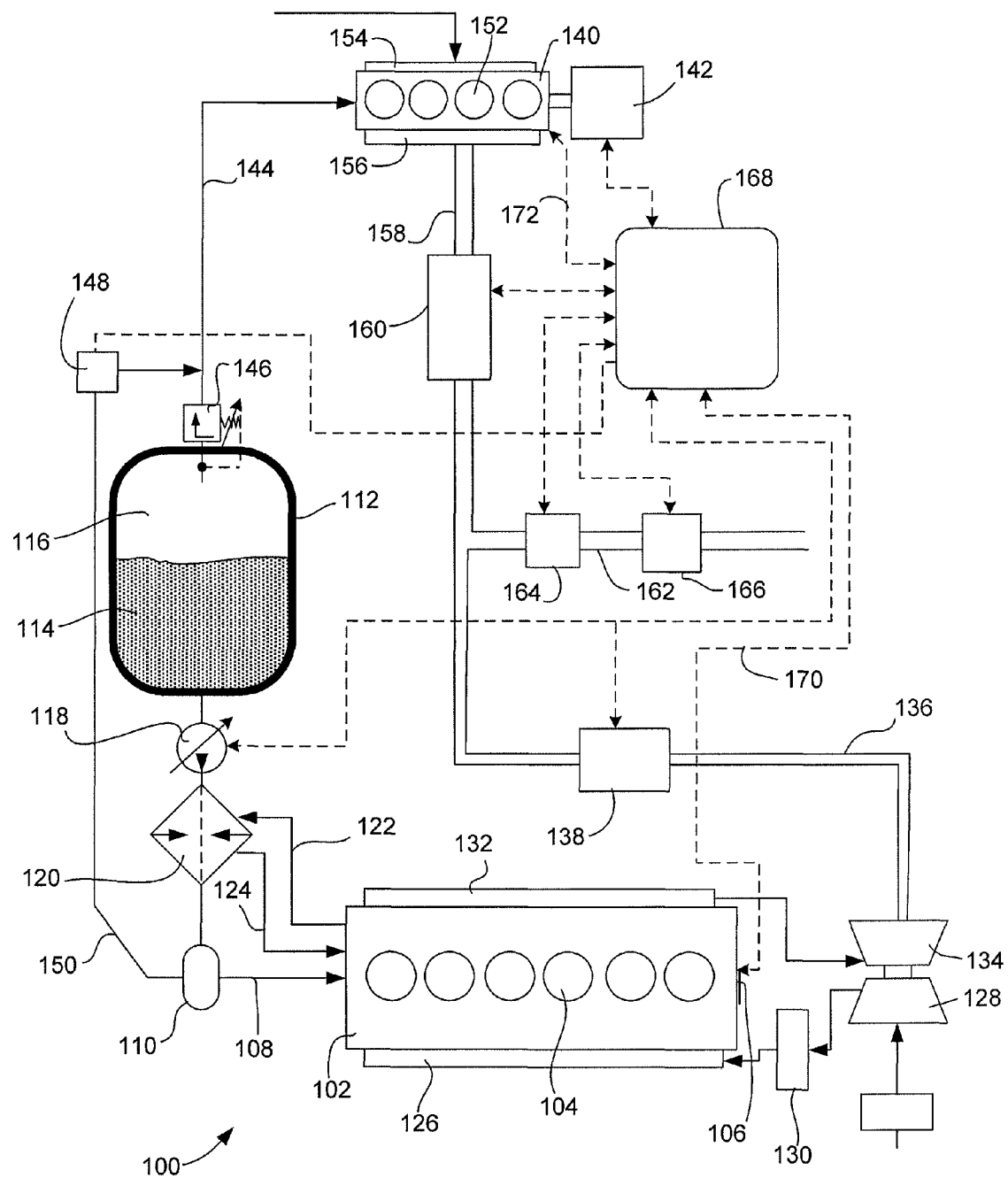
FIG. 1 is a block diagram for an engine system in accordance with the disclosure.

Accordingly, one particular embodiment of an internal combustion engine system 100 having a cryogenically stored gaseous fuel supply is shown in the block diagram of FIG. 1. The engine system 100 includes an internal combustion engine or main engine 102. The engine 102 may be a primary engine that is used to provide useful power to the system 100. The internal combustion engine 102 includes a plurality of cylinders 104, which are configured to combust an air/fuel mixture to produce useable power. For example, an output shaft 106 of the engine 102 may be connected to a transmission and other structures operating to drive ground engaging members and/or implements of a machine (not shown), an electrical power generator producing power to drive various systems and components such as electric motors associated with work implements or driving propel systems such as ground or rail engaging wheels, propellers for marine applications and the like in a machine (not shown), and the like. Moreover, the air/fuel mixture provided to the cylinders 104 may include more than one fuel such as a mixture of gaseous fuel that is directly injected or otherwise provided to the cylinders, along with diesel or gasoline. Ignition in each cylinder 104 may be the result of compression or may otherwise be initiated, for example, by use of sparking or other ignition device.

Relative to the present disclosure, the engine 102 operates at least in part on a gaseous fuel that is provided directly or indirectly to the engine cylinders 104 through a gas supply passage 108 that is connected to a gas accumulator 110. The gas accumulator 110 contains gas at an operating pressure that is of a temperature and density that is appropriate for use by the engine 102. A supply of gaseous fuel is stored in the engine system 100 within a cryogenic storage tank 112. A portion of the gaseous fuel within the storage tank 112 is kept in a liquid, cryogenic phase 114, and the remaining volume of the tank 112 is filled with gas at a gaseous phase 116. During operation, as the liquid phase 114 may absorb heat from the environment of the tank 112, a certain portion of the gaseous fuel will evaporate to form the gaseous phase 116, which may be maintained under pressure within the tank 112.

In a typical application, gaseous fuel 114 is compressed in a variable compression pump 118 from the storage pressure within the tank 112 to about the operating pressure within the accumulator 110. The compressed gaseous fuel at the pump 118 is provided through a heater 120, which increases the temperature of the gaseous fuel to be close to that of the gaseous phase for the particular gaseous fuel. As shown, the heater 120 is a liquid to gas heat exchanger that receives warm engine coolant through supply and return lines 122 and 124 from the engine 102, but other sources of heat and/or other heater configurations may be used.

During operation, at least a portion of the fuel in the air/fuel mixture combusted in the cylinders 104 is provided through the gaseous fuel supply passage 108. Air is provided to the cylinders 104 through an intake manifold 126, which receives compressed air from a compressor 128 after the air passes through a charge air cooler 130 in the known fashion. After combustion of the air/fuel mixture within each cylinder 104, combustion byproducts in the form of exhaust gas are collected in an exhaust manifold 132 and provided to operate a turbine 134, which is associated with and configured to power the compressor 128. Although one turbine and compressor are shown here, more or fewer such devices arranged in series and/or in parallel connection with one another may be used, as is known. Moreover, although the turbine 134 is shown directly connected to the exhaust manifold 132, it may alternatively be disposed elsewhere in the system.

Exhaust gas from the exhaust manifold 132 is provided to a first exhaust passage 136, which in the illustrated embodiment is shown connected to an outlet of the turbine 134. In an alternative embodiment (not shown), the first exhaust passage 136 may be connected directly to the exhaust manifold 132. The first exhaust passage 136 may optionally include an oxidation catalyst 138, which is configured to control a ratio of nitric oxide (NO) and nitrogen dioxide ($NO_2$) of an exhaust gas stream passing through the first exhaust passage 136 during operation of the engine 102. In certain applications such as, for example, locomotives, control of the ratio of NO and $NO_2$ may not be required and the oxidation catalyst 138 may be omitted. In the illustrated embodiment, the oxidation catalyst 138 operates to control the ratio of NO and $NO_2$ to a range between 1:0.25 and 1:1. In addition to the oxidation catalyst 138, a variety of additional catalysts and/or filters may be included in the first exhaust passage 136. Examples of such additional catalysts and/or filters include particulate filters such as diesel particulate filters, in applications where diesel particulates are to be controlled, nitrogen oxide (NOx) traps, three-way catalysts, and others.

In addition to the primary engine 102, the system 100 further includes a secondary or auxiliary engine 140. The auxiliary engine 140 may have a smaller displacement than the primary engine 102 and be used to operate auxiliary components and systems 142, which are generically illustrated in FIG. 1 for simplicity but which may include the variable compression pump 118, electrical generators or alternators (not shown), air compressors (not shown), blower fans (not shown), and any other engine-powered accessory of the system 100. In the embodiment shown, the auxiliary engine 140 operates by using natural gas vented from the tank 112, which would otherwise have been released to the environment, and is configured to produce relatively high NOx levels. The NOx thus produced by the auxiliary engine is transformed to ammonia, as described in further detail in the paragraphs that follow, which ammonia is then used in a selective catalytic reaction (SCR) exhaust after-treatment system. As is known, an SCR system would otherwise require an ammonia source onboard the system 100, which can be omitted in favor of the on-board ammonia production provided by the auxiliary engine 140.

More specifically, the auxiliary engine 140 receives natural gas via a vent passage 144 that is connected to the tank 112. Gas in the vent passage 144 is provided through a vent valve 146, which normally vents the tank 112 to maintain an acceptable gas pressure therein. At times when additional gas is required to operate the auxiliary engine 140 beyond the gas that is vented, a secondary gas valve 148 can provide a metered amount of gas to the vent passage 144 from the gas accumulator 110 via an auxiliary gas supply passage 150. Alternatively, a separate heater (not shown) can be used to heat CNG from the tank 112 for use by the auxiliary engine 140 when the vented gas from the vent valve 146 is insufficient to meet engine demands.

The auxiliary engine 140 includes a plurality of cylinders or as few as a single cylinder 152 that receives at least a mixture of natural gas and air for combustion. As previously described, natural gas is provided to the cylinders 152 via the passage 144 and other components, such as injectors or fumigators, which are not shown for simplicity. Air is provided to the cylinders 152 via an intake manifold 154 at an ambient or elevated pressure. In one embodiment, for example, air may be provided from the compressor 128 or an additional, dedicated compressor (not shown). Exhaust gas from the cylinders 152 of the auxiliary engine 140 is collected in an exhaust manifold 156, from where it is routed into a second exhaust passage 158.

The second exhaust passage 158 includes an ammonia producing catalyst 160 that is configured to convert at least a portion of the exhaust gas stream from the auxiliary engine 140 into ammonia ($NH_3$). In one embodiment, ammonia may be produced in the ammonia producing catalyst 160 by a reaction between NOx and other substances in the exhaust gas stream from the auxiliary engine 140. For example, NOx may react with a variety of other combustion byproducts to produce ammonia. These other combustion byproducts may include, for example, hydrogen gas ($H_2$), propene ($C_3H_6$), carbon monoxide (CO), and other compounds.

The ammonia producing catalyst 160 may be made from a variety of materials. In one embodiment, the ammonia producing catalyst 160 may include a perovskite like $ABX3$, where A and B are cations and X is an anion, e.g., $CaTiO_3$. Further, the ammonia producing catalyst 160 may include at least one of platinum, palladium, rhodium, iridium, copper, chrome, vanadium, titanium, iron, and cesium. Combinations of these elements may also be used. Specifically, the catalyst material may be chosen based on the type of fuel used, the air to fuel-vapor ratio desired, or based on other considerations such as conformity with environmental standards.

The first and second exhaust passages, respectively, 136 and 158, merge into a third exhaust passage 162 such that the exhaust gas stream from the primary engine 102, which is provided by the first exhaust passage 136 and is treated by the oxidation catalyst 138, and exhaust gas from the auxiliary engine 140, which is provided by the second exhaust passage 158 and is treated by the ammonia producing catalyst 160, can mix and be treated together as they pass through the third exhaust passage 162 before being released in the environment. In this way, the controlled ratio of NO and $NO_2$ from the first exhaust passage stream, and the ammonia contained in the second exhaust passage stream, can be combined and provided to an SCR system for treatment.

In the illustrated embodiment, the third exhaust passage 162 includes a NOx-reducing catalyst 164, which facilitates a reaction between ammonia and NOx to at least partially remove NOx from the exhaust-gas stream in the third exhaust passage 162. For example, the NOx-reducing catalyst 164 may facilitate a reaction between ammonia and NOx to produce nitrogen gas and water, among other reaction products, in accordance with the following, generic equation:

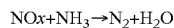

$$NOx + NH_3 \rightarrow N_2 + H_2O$$

In the illustrated embodiment, the third exhaust passage 162 further includes a diesel particulate trap (DPF) 166.

As can be appreciated, the relative amounts of NOx in the first and second exhaust gas streams combined, and the amount of ammonia produced in the second exhaust gas stream, should be controlled to promote efficient operation of the NOx-reducing catalyst 164. In the illustrated embodiment, various engine parameters of the primary engine 102 are monitored to estimate the amount of NOx present in the first exhaust gas stream. Similarly, various engine operating parameters of the auxiliary engine 140 are controlled to produce controlled amounts of ammonia while also estimating the amount of NOx that remains in the second exhaust gas stream. In these conditions, it is desired to match the molar flow rate of ammonia provided by the second exhaust gas stream with the molar flow rate of NOx that is provided by the first and second exhaust gas streams. By matching the molar flow rate of ammonia with the molar flow rate of NOx provided to the NOx-reducing catalyst 164, the efficiency of abatement of NOx in the third exhaust gas stream may be maximized.

As used herein, molar flow rate refers to the mass flow rate of the corresponding compounds expressed in g-moles/s, and is intended to be an expression of mass flow rate for the respective compound, although other expressions of mass flow rate can be used.

In the illustrated embodiment, the coordinated control and monitoring of the operation of the primary and auxiliary engines 102 and 140 is provided by an electronic controller 168. The electronic controller 168 may be a single controller or may include more than one controller disposed to control various functions and/or features of the system 100 and/or a machine in which the system 100 is operating. For example, a master controller, used to control the overall operation and function of the machine, may be cooperatively implemented with a motor or engine controller, used to control the engine 102 and/or the engine 140. In this embodiment, the term "controller" is meant to include one, two, or more controllers that may be associated with the system 100 and that may cooperate in controlling various functions and operations of the system 100. The functionality of the controller, while shown and described conceptually herein to include various discrete functions, is for illustrative purposes only and may be implemented in hardware and/or software without regard to the discrete functionality shown. Accordingly, various interfaces of the controller are described relative to components of the system shown in the FIG. 1, but such interfaces are not intended to limit the type and number of components that are connected, nor the number of controllers that are described.

Accordingly, the controller 168 is connected to various components and systems of the primary engine 102 via a primary engine communication line 170, through which appropriate engine operation commands can be provided as well as various engine operating parameter signals can be returned. Similarly, an auxiliary engine communication line 172 provides commands and returns information relative to the operating state of the auxiliary engine 140 to and from the controller 168. The controller 168 further communicates with the various auxiliary systems 142, the secondary gas valve 148, and the variable displacement pump 118. Various sensors (not shown) associated with the oxidation catalyst 138, ammonia-producing catalyst 160, NOx-reducing catalyst 164, and diesel particulate filter 166, may provide information to the controller 168 that is indicative of their operating state in terms of temperature, extent of clogging, and other parameters.

Figure 2:
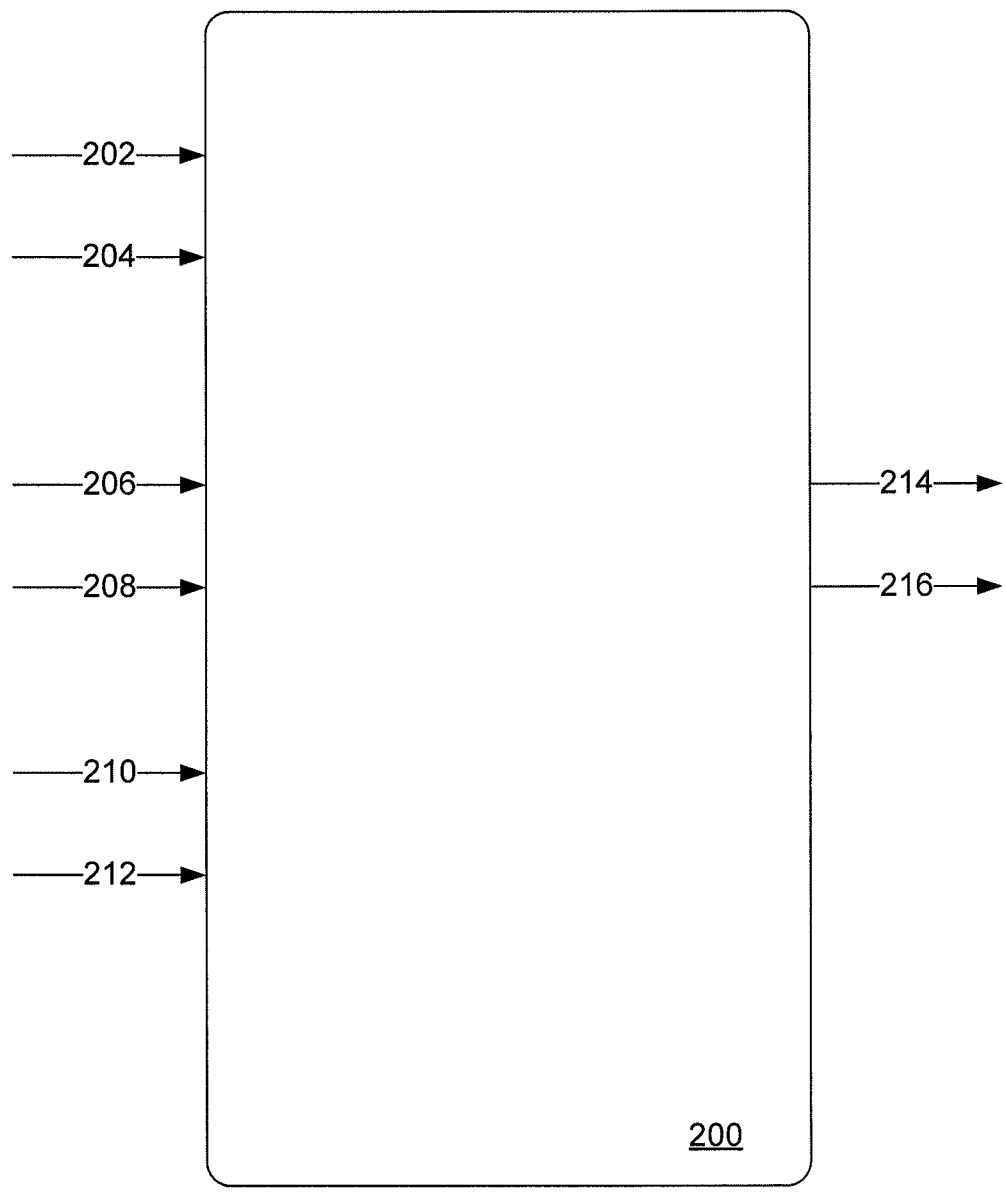
FIG. 2 is a block diagram for an auxiliary power and emissions controller in accordance with the disclosure.

A block diagram for one aspect of the operation of the controller 168 is shown in FIG. 2. The controller 168 may include a control system 200 that provides commands based on engine parameters to control the operation of the auxiliary engine 140 such that sufficient power is provided to the various systems 142 driven thereby and/or to provide a sufficient molar flow of $NH_3$ in the second exhaust passage 158 for treating the exhaust products from the main engine 102 that are provided through the first exhaust passage 136. More specifically, control of the auxiliary engine 140 by the controller 168, i.e., control of the fueling of the auxiliary engine 140 on the basis of engine power, engine speed and engine emissions, may be calculated based on different factors depending on the demands of the system. In one exemplary embodiment, the controller 168 may calculate a desired engine speed, fueling and load for the auxiliary engine 140 based on either the power demands required to operate the driven loads 142, or an estimated NOx output of the main engine 102.

Depending on the desired auxiliary engine operating condition, the supply of natural gas from the vent valve 146 may be insufficient to operate the auxiliary engine 140 at the desired state. Under such conditions, the controller 168 may command additional natural gas drawn from the accumulator 110 to be provided to the auxiliary engine 140 via the auxiliary gas line 150 by commanding a predetermined opening of the gas valve 148. The opening of the valve 148 may further depend on the pressure of gas in the accumulator 110 and/or on the pressure of natural gas within the vent passage 144.

Accordingly, as shown in the block diagram of FIG. 2, the control system 200 receives as inputs signals indicative of the engine speed and load, respectively, 202 and 204, of the main engine 102. The then present engine speed and load of the auxiliary engine 206 and 208 are also monitored. A signal indicative of the requested power 210 that is required to operate the auxiliary systems 142 (FIG. 1) is provided, as well as a gas pressure signal 212, which is indicative of the pressure of natural gas or otherwise the supply of natural gas through the vent passage 144 (FIG. 1) to the auxiliary engine 140 (FIG. 1). Additional signals may also be provided that are indicative of the overall operational state of the system and/or after-treatment devices, which are not shown in FIG. 2 for simplicity.

The control system 200 may provide various outputs, including an auxiliary engine control signal 214 and an auxiliary engine gas supply valve control signal 216. The auxiliary engine control signal 214, depending on the type of engine used, may represent a desired fueling and/or engine speed command signal that is provided to the auxiliary engine 140 and is configured to cause the auxiliary engine 140 to operate in a desired fashion in terms of engine speed, engine load, engine power, and/or engine emissions. The control signal 216 may be an electrical or other type of signal configured to cause a change in the flow characteristic of the secondary gas valve 148, which can in turn increase the gas supply to the auxiliary engine 140 when necessary.

During operation, the control system 200 in one embodiment may perform concurrent calculations and/or determinations on the desired operating point of the auxiliary engine 140. As previously discussed, one operating point may be determined on the basis of the minimum power required to operate the auxiliary components and systems 142 (FIG. 1), which may also include the pump 118. Another operating point may be determined on the basis of the molar flow of $NH_3$ that is required to be present in the second exhaust passage 158. For this determination, the control system 200 may first determine the molar flow of NOx emissions in the first exhaust passage 136 based on the engine speed and load 202 and 204 of the main engine 102, for example, by use of tabulated data or other appropriate functions such as modeling algorithms, and/or based on environmental factors such as temperature and altitude. Having determined the molar flow of NOx in this way, the control system 200 may then determine a desired operating point for the auxiliary engine 140, which will produce exhaust gas having a composition that will yield a predetermined and desired molar flow of $NH_3$ at the outlet of the ammonia-producing catalyst 160 (FIG. 1). For this operating point, the main driving characteristic is to match the molar flow of ammonia with the molar flow of NOx for all gases that are combined within the merged exhaust passage 162, which include any leftover NOx gas from the auxiliary engine 140.

Having determined two desired operating points for the auxiliary engine 140 in this fashion, the control system 200 may select one of the two operating points as a basis for providing the engine command signal 214. Election of one operating point over the other is made based on the engine power output requirements and emissions requirements. In one embodiment, the auxiliary engine 140 may operate at a substantially constant engine speed such that the engine command signal represents an engine fueling command. The engine power and estimated emissions for each of the two desired operating points are determined, and the operating point having sufficient power and appropriate emissions is selected. In the event none of the two operating points can satisfy both engine power and emissions requirements, emissions concerns can take priority over power requirements. In such situations, the desired power consumption may be adjusted by the controller, for example, by disabling driven accessories that are not essential to system operation at least temporarily.

Figure 3:
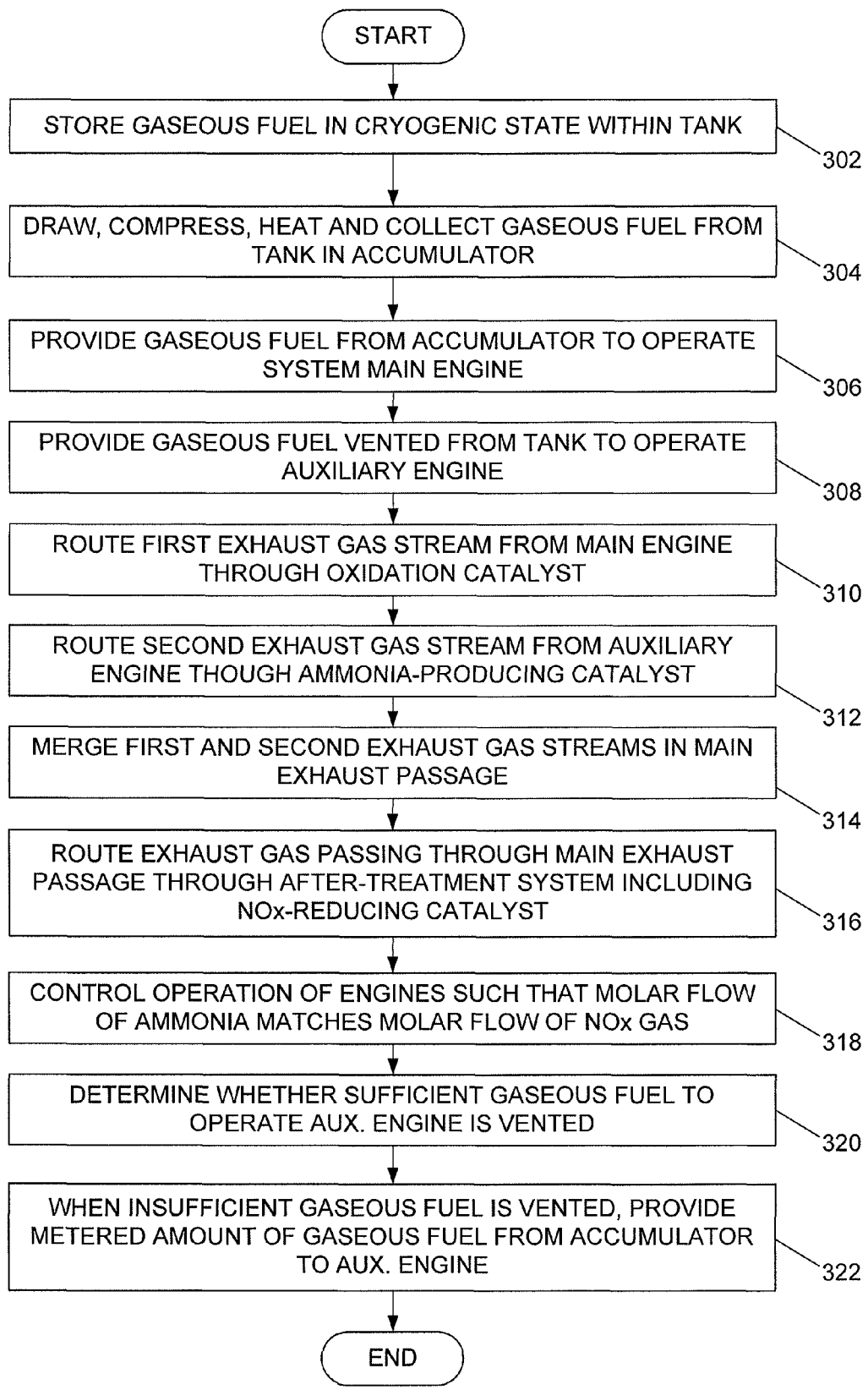
FIG. 3 is a flowchart for a method of gaseous fuel recovery in accordance with the disclosure.

A flowchart for a method of operating an auxiliary power and emission-control system using gas recovery is shown in FIG. 3. The method includes storing a gaseous fuel such as natural gas in a cryogenic state within a tank at 302. A stream of the gaseous fuel is drawn from the tank, compressed, heated to an operating temperature, and collected in an accumulator at 304. Gas from the accumulator is provided to operate a main engine of the system at 306, which provides the useful power output of the system. Gas vented from the tank, as well as gas from the accumulator, as required, is provided to operate an auxiliary engine at 308, which is used to power auxiliary and/or secondary components of the system.

A first exhaust gas stream from the main engine is collected and routed through an exhaust gas treatment device such as an oxidation catalyst at 310. In one embodiment, the oxidation catalyst is configured to control a ratio of nitric oxide (NO) and nitrogen dioxide ($NO_2$) of the first exhaust gas stream. A second exhaust gas stream from the auxiliary engine is collected and routed through an additional exhaust treatment device such as an ammonia producing catalyst at 312. In one embodiment, the ammonia producing catalyst is configured to convert at least a portion of NOx gases included in the second exhaust gas stream from the auxiliary engine into ammonia ($NH_3$).

The first and second exhaust gas streams are merged at 314 in a main exhaust passage. Exhaust gas passing through the main exhaust passage is routed through an after-treatment system that includes an NOx-reducing catalyst at 316. In one embodiment, the after-treatment system includes at least a selective catalytic reduction (SCR) catalyst which is essentially a NOx-reducing catalyst. In one embodiment, the NOx reducing catalyst is configured to facilitate a reaction between ammonia and NOx to at least partially remove NOx from the exhaust-gas stream. During operation, the ammonia is provided in mixture with the second exhaust gas stream, and NOx is provided in mixture with both the first and second exhaust gas streams.

In a controller, operation of the main and/or auxiliary engine(s) is adjusted at 318 such that a molar flow of ammonia matches a molar flow of NOx gases in the main exhaust passage. Operation adjustments can be accomplished by providing appropriate commands from the controller to various components and systems of the engines based on engine operating parameters provided to the controller via signals. In one embodiment, the exhaust gas stream in the main exhaust passage is routed through a particulate trap, muffler, or other devices. It should be appreciated, however, that in the event the main engine and/or the auxiliary engine operate by spark ignition rather than with diesel pilot ignition, a particulate trap may not be required. In general, an engine operating with diesel pilot ignition will also not require a particulate trap.

Use of a particulate trap will depend on the amount of particulates generated during engine operation and the need to abate those emissions.

In one embodiment, the method further includes determining, in the controller, whether a sufficient gaseous fuel supply to operate the auxiliary engine is vented from the tank at 320. When an insufficient supply of gaseous fuel is provided, the controller may cause a metered amount of gas from the accumulator of the main engine to be provided to the auxiliary engine at 322. This process may repeat while the system is operational.

INDUSTRIAL APPLICABILITY

The present disclosure is applicable to systems having an engine operating primarily on a gaseous fuel source, which stores the gaseous fuel in a cryogenic state and confined within a tank. Where in the past excess gas from the tank was wasted by venting to the atmosphere, the present provides at least one embodiment for a system and method of recovering the vented gas for use in an auxiliary power and emissions-control system. As is more generally described herein, the recovered gas is used to operate an auxiliary engine. The auxiliary engine, advantageously, is used to power auxiliary systems such as pumps, compressors, and the like, without the need to use useful power from the main engine. Moreover, the auxiliary engine is operated in a NOx-rich state. NOx generated by the auxiliary engine is provided to an ammonia-producing catalyst, which operates as an on-board ammonia production plant. The ammonia thus produced is provided to after-treatment devices operating to reduce NOx in a combined exhaust gas stream from the main and auxiliary engines. Control of the auxiliary engine is accomplished in a coordinated fashion with operation of the main engine such that the molar or mass flow of ammonia produced by the plant substantially matches the molar or mass flow of the total NOx in the combined exhaust gas stream from the main and auxiliary engines that will be treated or reduced. For example, the total mass flow of NOx may be treated in certain applications, while other applications may only require treatment of 25% to 50% of the total mass flow of NOx produced.

Although the embodiment described includes two separate engines, the main engine and the auxiliary engine, it is contemplated that a single engine having two groups of cylinders therein fulfilling the roles of the main and auxiliary engines may instead be used.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An auxiliary power and emission-control system using gaseous fuel recovery, comprising:
   a cryogenic gaseous fuel storage tank for containing a gaseous fuel, the tank having a vent;
   a main engine that operates using the gaseous fuel;
   a primary gaseous fuel supply system for supplying the gaseous fuel from the tank to the main engine;
   an auxiliary engine that operates using the gaseous fuel, the auxiliary engine providing power to at least one auxiliary component of the auxiliary power and emission-control system;
   a secondary gaseous fuel supply system for supplying the gaseous fuel from the vent to the auxiliary engine;
   a first exhaust passage for receiving a first stream of exhaust gas from the main engine;
   a second exhaust passage for receiving a second stream of exhaust gas from the auxiliary engine;
   an ammonia-producing catalyst disposed along the second exhaust passage for treating the second stream of exhaust gas from the auxiliary engine;
   a third exhaust passage fluidly connected to the first and second exhaust passages, the third exhaust passage for routing the first and second exhaust gas streams;
   a NOx reducing catalyst disposed along the third exhaust passage for treating the first and second streams of exhaust gas;
   wherein the auxiliary power and emission-control system is configured to operate such that the second exhaust gas stream generates a mass flow of ammonia that substantially matches a total mass flow of NOx gas in the third exhaust passage that is treated by the NOx reducing catalyst.

2. The auxiliary power and emission-control system of claim 1, further comprising:
   a pump for pressurizing the gaseous fuel to an operating pressure, the pump disposed along the primary gaseous fuel supply system between the tank and the main engine;
   an accumulator for collecting gaseous fuel at the operating pressure, the accumulator disposed along the primary gaseous fuel supply system between the pump and the main engine.

3. The auxiliary power and emission-control system of claim 2, further comprising a secondary gas supply valve for selectively fluidly interconnecting the accumulator with the secondary gaseous fuel supply system.

4. The auxiliary power and emission-control system of claim 3, wherein gaseous fuel from the accumulator can be supplied to operate the auxiliary engine in addition to gaseous fuel provided to the auxiliary engine from the vent.

5. The auxiliary power and emission-control system of claim 2, wherein the pump is the at least one auxiliary component connected to and disposed to receive power from the auxiliary engine.

6. The auxiliary power and emission-control system of claim 1, wherein the oxidation catalyst is configured to control a ratio of nitric oxide (NO) and nitrogen dioxide ($NO_2$) of the first exhaust gas stream.

7. The auxiliary power and emission-control system of claim 1, further comprising an oxidation catalyst disposed along the first exhaust passage for treating the first stream of exhaust gas from the main engine.

8. A gaseous fuel recovery and emission control system, comprising:
- a cryogenic gaseous fuel storage tank for containing the gaseous fuel, the tank having a vent for regulating a tank pressure by expelling gaseous fuel from the tank;
- a primary gaseous fuel supply system adapted for supplying the gaseous fuel from the tank to a first internal combustion engine;
- a secondary gaseous fuel supply system adapted for supplying the gaseous fuel from the vent to a second internal combustion engine;
- a pump for pressurizing the gaseous fuel to an operating pressure, the pump disposed along the primary gaseous fuel supply system between the tank and the first internal combustion engine;
- an accumulator for collecting gaseous fuel at the operating pressure, the accumulator disposed along the primary gaseous fuel supply system between the pump and the first internal combustion engine; and
- a secondary gas supply valve for selectively fluidly interconnecting the accumulator with the secondary gaseous fuel supply system such that gaseous fuel from the accumulator can be supplied to operate the second internal combustion engine in addition to gaseous fuel provided to the second internal combustion engine from the vent.

9. The gaseous fuel recovery and emission control system of claim 8, further comprising:
- a first exhaust passage adapted for receiving a first stream of exhaust gas from the first internal combustion engine;
- a second exhaust passage adapted for receiving a second stream of exhaust gas from the second internal combustion engine;
- an ammonia-producing catalyst disposed along the second exhaust passage for treating the second stream of exhaust gas from the second internal combustion engine;
- a third exhaust passage fluidly connected to the first and second exhaust passages, the third exhaust passage for routing the first and second exhaust gas streams; and
- a NOx reducing catalyst disposed along the third exhaust passage for treating the first and second streams of exhaust gas;
- wherein the gaseous fuel recovery and emission control system is configured to operate such that the second exhaust gas stream generates a mass flow of ammonia that substantially matches a total mass flow of NOx gas in the third exhaust passage.

10. The gaseous fuel recovery and emission control system of claim 8, further comprising an oxidation catalyst disposed along the first exhaust passage for treating the first stream of exhaust gas from the first internal combustion engine, wherein the oxidation catalyst is configured to control a ratio of nitric oxide (NO) and nitrogen dioxide ($NO_2$) of the first exhaust gas stream.

11. The gaseous fuel recovery and emission control system of claim 10, wherein the oxidation catalyst operates to control the ratio of NO and $NO_2$ to in a range between 1:0.25 to 1:1.

12. The gaseous fuel recovery and emission control system of claim 8, further comprising an electronic controller associated with and adapted to control the operation of the first and second internal combustion engines, and the secondary gas supply valve.

13. The gaseous fuel recovery and emission control system of claim 8, wherein the pump is connected to and powered by the second internal combustion engine.

14. A method for recovering a gaseous fuel from a tank vent and for controlling emissions in an engine system, comprising:
- storing a gaseous fuel such as natural gas in a cryogenic state within a tank;
- drawing from the tank, compressing to an operating pressure, heating to an operating temperature a stream of the gaseous fuel, and collecting the gaseous fuel in an accumulator;
- providing gaseous fuel from the accumulator to operate a main engine of the system
- providing gaseous fuel vented from the tank and gaseous fuel from the accumulator, as required, to operate an auxiliary engine;
- collecting a first exhaust gas stream from the main engine;
- collecting a second exhaust gas stream from the auxiliary engine;
- converting at least a portion of NOx gases included in the second exhaust gas stream from the auxiliary engine into ammonia;
- merging the first and second exhaust gas streams in a main exhaust passage, and routing exhaust gas passing through the main exhaust passage through a NOx-reducing catalyst.

15. The method of claim 14, further comprising controlling a ratio of NO and $NO_2$ by routing the first exhaust gas stream through an oxidation catalyst.

16. The method of claim 14, further comprising reacting ammonia and NOx in the NOx-reducing catalyst to at least partially remove NOx from the exhaust gas stream in the main exhaust passage.

17. The method of claim 14, further comprising adjusting in a controller operation of the main and auxiliary engines such that a molar flow of ammonia matches a molar flow of NOx gases in the main exhaust passage.

18. The method of claim 14, further comprising determining, in a controller, whether a sufficient gaseous fuel supply to operate the auxiliary engine is vented from the tank and, when an insufficient supply of gaseous fuel is provided from the vent, causing a metered amount of gas from the accumulator of the main engine to be provided to the auxiliary engine.

19. The method of claim 14, wherein compressing the gaseous fuel is accomplished by compressing the gaseous fuel from the tank, still in a liquid phase, in a pump.

20. The method of claim 19, wherein the pump is connected to and powered by the auxiliary engine.

* * * * *